United States Patent
Suzuki

(10) Patent No.: US 10,061,372 B2
(45) Date of Patent: Aug. 28, 2018

(54) INFORMATION PROCESSING APPARATUS AND PERIPHERAL DEVICE USED BY THE SAME

(71) Applicant: TOSHIBA TEC KABUSHIKI KAISHA, Shinagawa-ku, Tokyo (JP)

(72) Inventor: Katsuyuki Suzuki, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 14/930,700

(22) Filed: Nov. 3, 2015

(65) Prior Publication Data

US 2016/0195915 A1 Jul. 7, 2016

(30) Foreign Application Priority Data

Jan. 6, 2015 (JP) .................. 2015-001061

(51) Int. Cl.
*G06F 1/32* (2006.01)
*H04B 5/00* (2006.01)
*H02J 50/90* (2016.01)

(52) U.S. Cl.
CPC .......... *G06F 1/3218* (2013.01); *G06F 1/3212* (2013.01); *G06F 1/3265* (2013.01);
(Continued)

(58) Field of Classification Search
CPC .................................................. G06F 1/3218
(Continued)

(56) References Cited

U.S. PATENT DOCUMENTS 5,963,012 A * 10/1999 Garcia ............... G01R 31/3648
320/106
7,793,121 B2 * 9/2010 Lawther .................. H02J 7/025
136/243
(Continued)

FOREIGN PATENT DOCUMENTS

JP 4-243408 8/1992
JP 2003-153457 5/2003
(Continued)

OTHER PUBLICATIONS

Japanese Office Action for Japanese Patent Application No. 2015-001061 dated May 30, 2017.
(Continued)

*Primary Examiner* — Aurel Prifti
(74) *Attorney, Agent, or Firm* — Amin, Turocy & Watson LLP

(57) ABSTRACT

An information processing apparatus comprises a communication control module, an input module and a notification module. The communication control module controls the communication with a peripheral device which is associated with the information processing apparatus. The input module receives the input of the charging state information, output from the peripheral device, which indicates the state of non-contact power supply to the peripheral device with a non-contact manner in which no mechanical connection is taken with the peripheral device. The notification module notifies, if the input module receives the input of the charging state information, the state of the non-contact power supply for the peripheral device.

5 Claims, 7 Drawing Sheets

(52) U.S. Cl.
CPC ............ *H02J 50/90* (2016.02); *H04B 5/0031* (2013.01); *H04B 5/0037* (2013.01)

(58) Field of Classification Search
USPC ......... 320/109, 108, 106; 713/300; 307/104; 700/297
See application file for complete search history.

(56) References Cited

U.S. PATENT DOCUMENTS

| | | | | |
|---|---|---|---|---|
| 7,989,986 | B2* | 8/2011 | Baarman | H02J 7/025 307/104 |
| 8,185,755 | B2* | 5/2012 | Yamasuge | H04W 8/30 323/355 |
| 8,898,489 | B2* | 11/2014 | Sultenfuss | G06F 1/1632 307/104 |
| 8,946,939 | B2* | 2/2015 | Drennen | H02J 17/00 307/104 |
| 9,137,407 | B2* | 9/2015 | Onishi | H04N 1/00901 |
| 9,564,940 | B2* | 2/2017 | Park | H04B 5/0037 |
| 2007/0103110 | A1* | 5/2007 | Sagoo | H02J 7/025 320/109 |
| 2007/0123303 | A1* | 5/2007 | Book | H02J 7/0003 455/557 |
| 2008/0211458 | A1* | 9/2008 | Lawther | H02J 7/025 320/132 |
| 2010/0036773 | A1* | 2/2010 | Bennett | G06Q 20/3674 705/67 |
| 2010/0201315 | A1* | 8/2010 | Oshimi | H01M 10/46 320/108 |
| 2011/0127954 | A1* | 6/2011 | Walley | H01M 2/0267 320/108 |
| 2011/0221391 | A1* | 9/2011 | Won | H01M 10/44 320/108 |
| 2011/0270462 | A1* | 11/2011 | Amano | H02J 5/005 700/297 |
| 2012/0052923 | A1* | 3/2012 | Park | H01M 10/44 455/567 |
| 2012/0155349 | A1* | 6/2012 | Bajic | H04W 4/008 370/311 |
| 2012/0169608 | A1* | 7/2012 | Forutanpour | G09G 3/342 345/173 |
| 2014/0059360 | A1* | 2/2014 | Guthrie | G06F 1/30 713/300 |
| 2014/0145515 | A1* | 5/2014 | Jung | H02J 17/00 307/104 |
| 2014/0219512 | A1 | 8/2014 | Sasaki et al. | |
| 2014/0266025 | A1* | 9/2014 | Jakubowski | H02J 7/025 320/108 |
| 2014/0361735 | A1 | 12/2014 | Li et al. | |
| 2015/0048780 | A1* | 2/2015 | Listl | H01M 10/441 320/106 |
| 2015/0066640 | A1* | 3/2015 | Jung | G06Q 30/0251 705/14.49 |
| 2015/0214745 | A1* | 7/2015 | Yoon | H02J 17/00 307/104 |

FOREIGN PATENT DOCUMENTS

| | | |
|---|---|---|
| JP | 2003-264934 | 9/2003 |
| JP | 2006-141170 | 6/2006 |
| JP | 2006-203989 | 8/2006 |
| JP | 2006-238548 | 9/2006 |
| JP | 2010-206866 | 9/2010 |
| JP | 2013-085363 | 5/2013 |
| JP | 2013-207999 | 10/2013 |
| JP | 2013-216042 | 10/2013 |
| JP | 2014-017989 | 1/2014 |
| JP | 2014-135862 | 7/2014 |
| WO | 2012/169861 | 12/2012 |
| WO | 2014/088164 | 6/2014 |

OTHER PUBLICATIONS

Japanese Office Action for Japanese Patent Application No. 2015-001061 dated Aug. 15, 2017.
Extended European Search Report for European Patent Application No. 15202751.2 dated May 9, 2016.

* cited by examiner

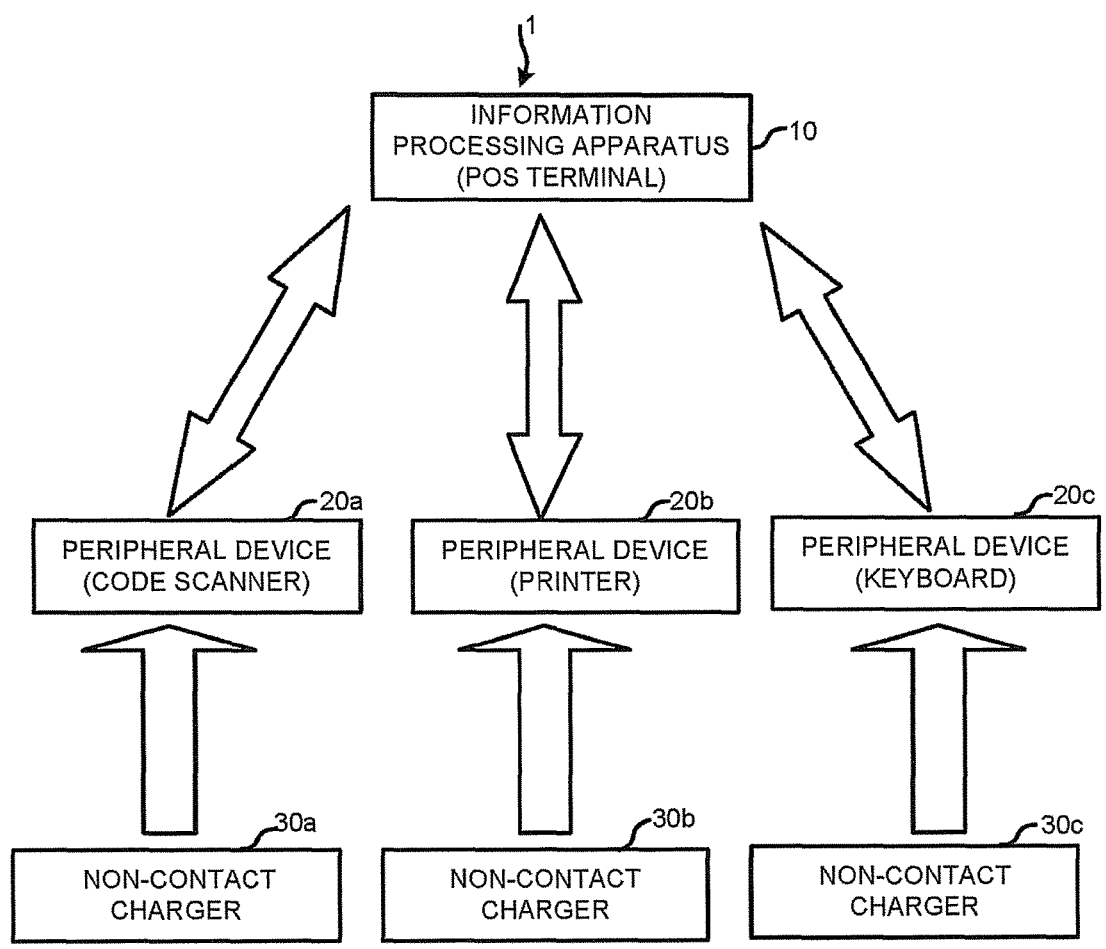
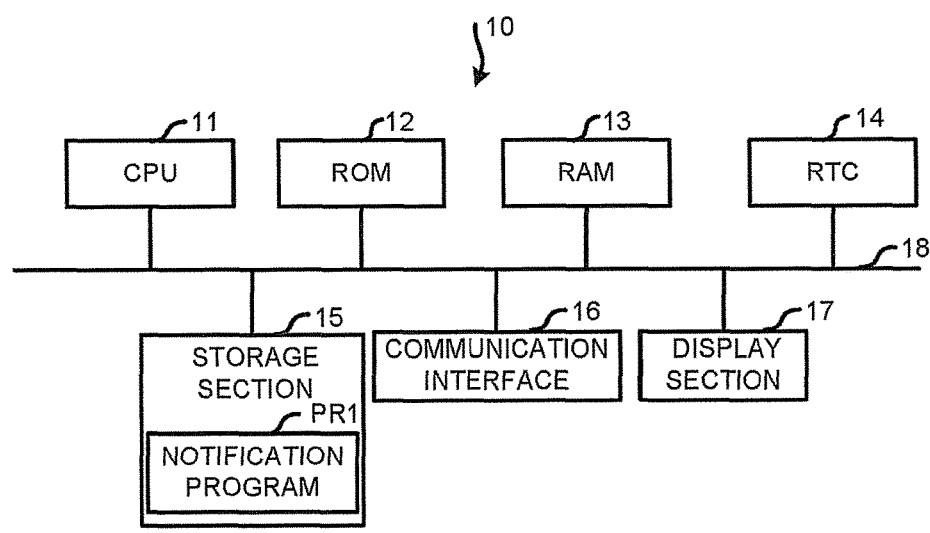

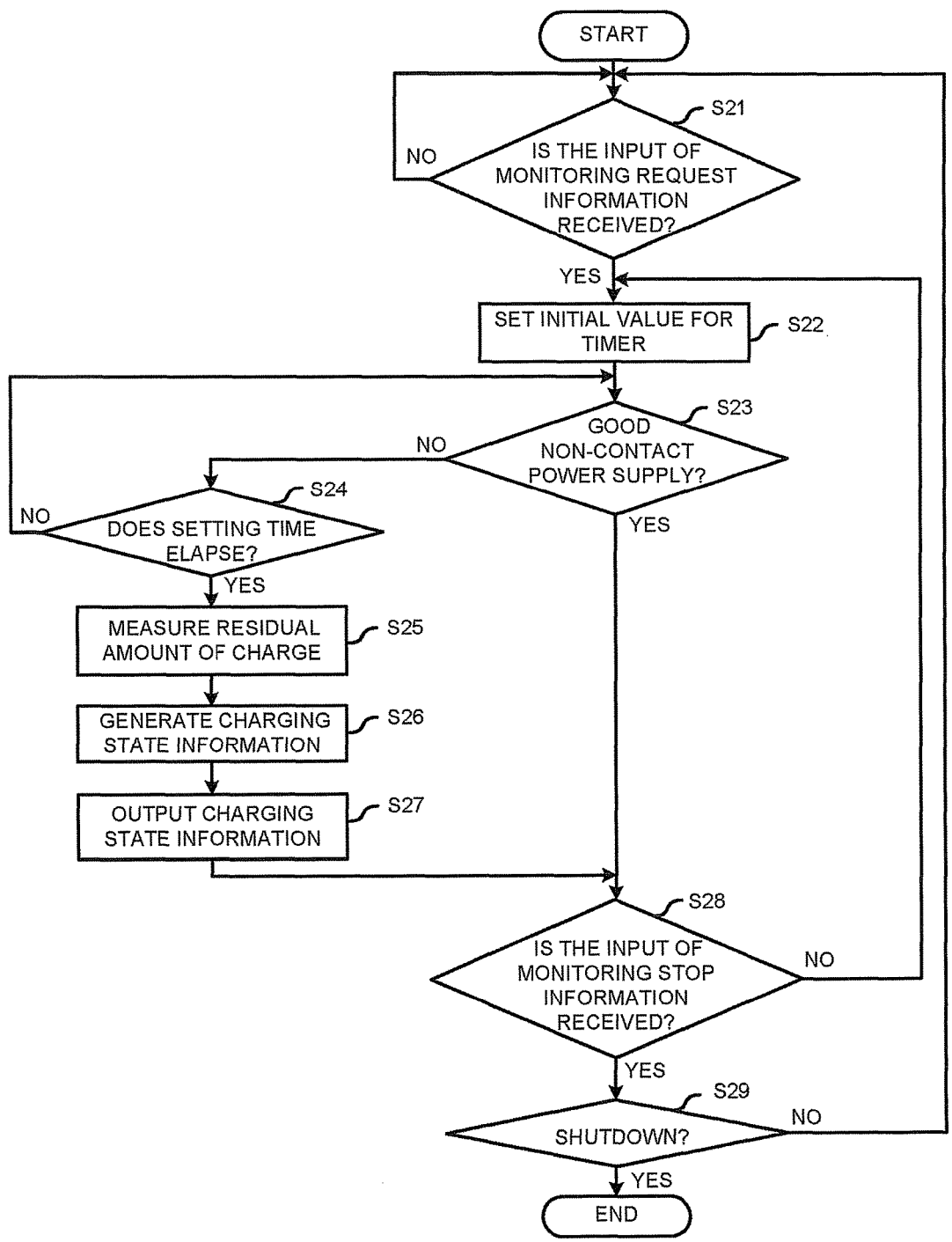

INFORMATION PROCESSING APPARATUS AND PERIPHERAL DEVICE USED BY THE SAME

CROSS-REFERENCE TO RELATED APPLICATION

This application is based upon and claims the benefit of priority from Japanese Patent Application No. 2015-001061, filed Jan. 6, 2015, the entire contents of which are incorporated herein by reference.

FIELD

Embodiments described herein relate generally to an information processing apparatus and a peripheral device which is used by the information processing apparatus.

BACKGROUND

A non-contact power supply system which transfers power without using a power cable has been used in recent years. The non-contact power supply system is capable of supplying electric power to a secondary battery carried on a personal computer, an AV (Audio Visual) device and the like with the use of the resonance phenomenon of an electromagnetic field.

Further, it is researched to introduce such a non-contact power supply system into a peripheral device of a POS (Point Of Sale) system. In a case in which a non-contact power supply system is introduced into a POS system, the peripheral device cannot be charged if a non-contact charger is not placed at a chargeable position. However, there is a case in which an operator of the POS system neglects or unintentionally forgets to place the peripheral device at a chargeable position because he/she always gives priority to sales-register the commodities.

DESCRIPTION OF THE DRAWINGS

FIG. 1 is a diagram illustrating the structure of a POS system according to an embodiment;

FIG. 2 is a block diagram exemplifying the hardware structure of a POS terminal;

FIG. 10 is a flowchart illustrating the procedure of a charge-monitoring processing.

DETAILED DESCRIPTION

Figure 3:
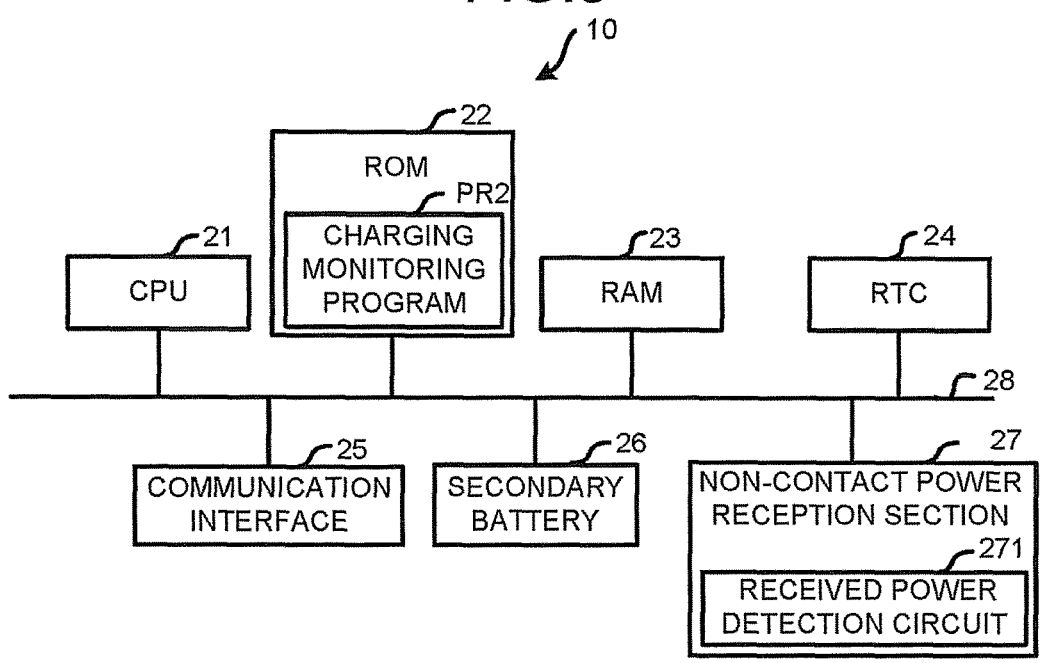
FIG. 3 is a block diagram exemplifying the hardware structure of a peripheral device.

In accordance with an embodiment, an information processing apparatus comprises a communication control module, an input module and a notification module. The communication control module controls the communication with a peripheral device which is associated with the information processing apparatus. The input module receives the input of the charging state information output from the peripheral device, which indicates the state of non-contact power supply to the peripheral device with a non-contact manner in which no mechanical connection is taken with the peripheral device. The notification module notifies, if the input module receives the input of the charging state information, the state of the non-contact power supply for the peripheral device.

Hereinafter, the information processing apparatus and the peripheral device according to the present embodiment are described below in detail with reference to the accompanying drawings. Descriptions hereafter are embodiments of the information processing apparatus and the peripheral device, and thus the structures and specifications thereof are not limited. The present embodiment is an example of applying a non-contact power supply system to a POS system which is introduced into a store such as a supermarket to carry out the sales registration and settlement of the commodities according to one transaction.

FIG. 1 is a diagram illustrating the structure of a POS system 1 according to a present embodiment. The POS system 1 comprises a POS terminal 10, a first peripheral device 20a, a second peripheral device 20b, a third peripheral device 20c, a first non-contact charger 30a, a second non-contact charger 30b and a third non-contact charger 30c.

The POS terminal 10 is an information processing apparatus for carrying out a commodity sales data processing. The first peripheral device 20a is, for example, a code scanner which optically reads a commodity code barcoded. The first non-contact charger 30a supplies electric power (hereinafter referred to as a power transmission) to the first peripheral device 20a in a non-contact manner. The first peripheral device 20a receives the electric power (hereinafter referred to as a power reception) supplied froth the first non-contact charger 30a in a non-contact manner. The first peripheral device 20a is charged with the received electric power. The 'non-contact' refers to the absence of a mechanical connection. For example, the 'non-contact' refers to that the non-contact charger 30a is not connected with the peripheral device 20a with a wire or a connector.

The second peripheral device 20b is, for example, a printer which prints the content of a transaction on a sheet such as a receipt paper to issue a receipt. The second non-contact charger 30b transmits electric power to the second peripheral device 20b in a non-contact manner. The second peripheral device 20b receives the electric power supplied from the second non-contact charger 30b in a non-contact manner. Moreover, the second peripheral device 20b is charged with the received electric power.

The third peripheral device 20c is, for example, a keyboard including various operation keys for the user to execute an input operation. The third non-contact charger 30c transmits electric power to the third peripheral device 20c in a non-contact manner. The third peripheral device 20c receives the electric power supplied from the third non-contact charger 30c in a non-contact manner. Moreover, the third peripheral device 20c is charged with the received electric power.

The peripheral devices 20a, 20b and 20c are commonly described hereinafter as a peripheral device 20 in a case in which they are not distinguished with each other. The non-contact chargers 30a, 30b and 30c are commonly described hereinafter as a non-contact charger 30 in a case in which they are not distinguished with one another. Further, the peripheral device 20 is not limited to those described above. The POS system 1 may further comprise other devices. The POS system 1 may be provided with more than one peripheral device 20 and more than one non-contact charger 30. Further, a plurality of peripheral devices 20 may share one non-contact charger 30.

Sequentially, the hardware structure of each foregoing device is described.

The POS terminal 10 is described first. FIG. 2 is a block diagram exemplifying the hardware structure of the POS terminal 10. As shown in FIG. 2, the POS terminal 10 comprises a CPU (Central Processing Unit) 11, a ROM (Read Only Memory) 12, a RAM (Random Access Memory) 13 and an RTC (Real Time Clock) 14. The CPU 11 collectively controls various operations or each section of the POS terminal 10. The ROM 12 stores various programs and data. The RAM 13 stores various programs temporarily and various data in a rewritable manner. The RTC 14 counts the current date and time The CPU 11 is connected with a storage section 15, a communication interface 16 and a display section 17 via a bus line 18.

The storage section 15 is an auxiliary storage device such as an HDD (Hard Disk Drive) or an SSD (Solid State Drive). The storage section 15 stores various programs executed by the CPU 11. Specifically, the storage section 15 stores, for example, a notification program PR1 which is a program for notifying the charging state of the peripheral device 20.

The communication interface 16 is wirelessly connected with the peripheral device 20. Specifically, the communication interface 16 communicates according to a standard such as a Bluetooth (Registered Trademark). Further, the communication interface 16 may adopt another standard other than Bluetooth. For example, the communication interface 16 may communicate according to a standard such as a Wireless Fidelity (Registered Trademark).

The display section 17 is, for example, a liquid crystal display. The display section 17 displays various kinds of information such as the commodity name and the price of a commodity the sales of which is registered and a total amount and a change amount of one transaction the settlement of which is declared. The display section 17 may be provided with a touch panel.

Next, the peripheral device 20 is described. FIG. 3 is a block diagram exemplifying the hardware structure of the peripheral device 20. As shown in FIG. 3, the peripheral device 20 comprises a CPU 21, a ROM 22, a RAM 23 and an RTC 24. The CPU 21 collectively controls various operations and each section of the peripheral device 20. The ROM 22 stores various data and programs such as a firmware for controlling the peripheral device 20. Specifically, the ROM 22 stores, for example, a charge-monitoring program PR2 which is a program for monitoring the charging state of the peripheral device 20. The RAM 23 stores various programs temporarily and various data in a rewritable manner. The RTC 24 counts the current date and time.

The CPU 21 is connected with a communication interface 25, a secondary battery 26 and a non-contact power reception section 27 via a bus line 28.

The communication interface 25 is wirelessly connected with the POS terminal 10. Specifically, the communication interface 25 communicates according to a standard such as Bluetooth. Further, the communication interface 25 may adopt another standard other than Bluetooth, for example, the communication interface 25 may communicate according to a standard such as Wireless Fidelity. In the present embodiment, the communication interface 25 adopts the same standard as the communication interface 16 of the POS terminal 10.

The secondary battery 26 is capable to be charged to store electricity. The secondary battery 26 supplies electric power to each section of the peripheral device 20. The secondary battery 26 is, for example, a lithium ion battery. Further, the secondary battery 26 may be another kind of battery other than lithium ion battery.

The non-contact power reception section 27 serving as a power reception section receives the electric power transmitted from the non-contact charger 30 in a non-contact manner. The non-contact power reception section 27 rectifies the received electric power. Moreover, the non-contact power reception section 27 charges the secondary battery 26 with the rectified electric power. The non-contact power supply system uses a well-known technology. The non-contact power supply system may be an electromagnetic induction system, a magnetic resonance system or another system.

The electromagnetic induction system refers to a system in which electric power is supplied in a non-contact manner with the use of the electromagnetic induction. In the electromagnetic induction system, coils are arranged at both a power transmission side from which electric power is supplied and a power reception side which receives the supplied electric power. Moreover, in the electromagnetic induction system, the coils at the power transmission side and those at the power reception side are arranged in side by side manner. If being supplied with electric power, the coils at the power transmission side generate magnetic flux in the inside of the coils. Since the coils at the power reception side are arranged at an adjacent position facing the coils at the power transmission side, magnetic flux also goes through the inside of the coils at the power reception side to generate an induced current. Consequentially, the coils at the power transmission side can supply electric power to the coils at the power reception side in a non-contact manner. There is a case in which the power supply efficiency is reduced if a positional deviation between the coils at the power transmission side and the power reception side occurs. This is because that the electromagnetic induction system generates the induced current in the coils at the power reception side, using the magnetic flux generated in the coils at the power transmission side.

The non-contact power reception section 27 comprises a received power detection circuit 271 for detecting the receiving condition of the electric power transmitted in a non-contact manner from the non-contact charger 30. Specifically, the received power detection circuit 271 detects the quantity of the electric power received in a non-contact manner from the non-contact charger 30 in each unit time.

The received power detection circuit 271 determines the state of non-contact power supply according to the detected quantity of the electric power received in each unit time. If the detected quantity of the electric power received in each unit time is greater than a first threshold value, the received power detection circuit 271 determines that the state of non-contact power supply is good. If the detected quantity of the electric power received in each unit time is smaller than the first threshold value but greater than a second threshold value, the received power detection circuit 271 determines that the state of non-contact power supply is poor. If the detected quantity of the electric power received in each unit time is smaller than the second threshold value, the received power detection circuit 271 determines that the state of non-contact power supply is bad.

Figure 4:
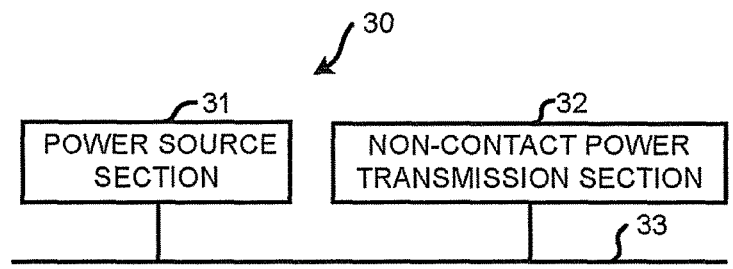
FIG. 4 is a block diagram exemplifying the hardware structure of a non-contact charger.

Next, the non-contact charger 30 is described. FIG. 4 is a block diagram exemplifying the hardware structure of the non-contact charger 30. As shown in FIG. 4, in the non-contact charger 30, a power source section 31 is connected with a non-contact power transmission section 32 through a wire 33.

The power source section 31 receives electric power supplied via a power cable (not shown). The power source section 31 rectifies the supplied electric power. Moreover, the power source section 31 supplies the rectified electric power to the non-contact power transmission section 32.

The non-contact power transmission section 32 transmits the electric power supplied from the power source section 31 to the peripheral device 20 in a non-contact manner. In the present embodiment, the non-contact system is the same as that in the peripheral device 20.

Figure 5:
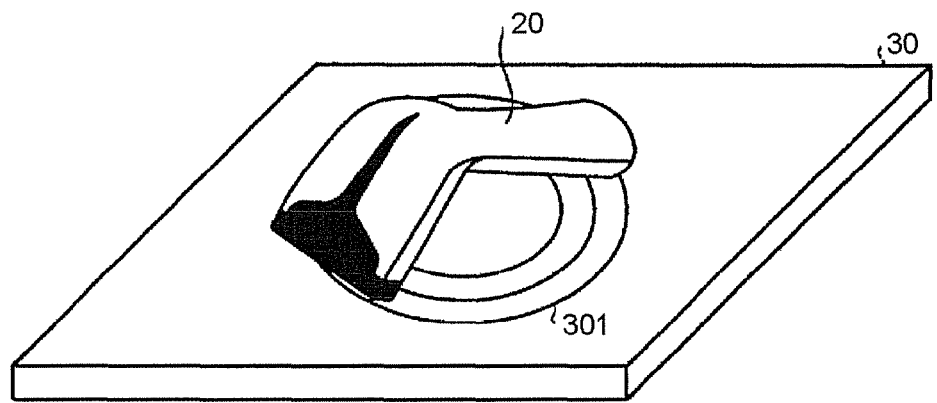
FIG. 5 is an illustration diagram exemplifying the arrangement of the peripheral device at a proper position.
Figure 6:
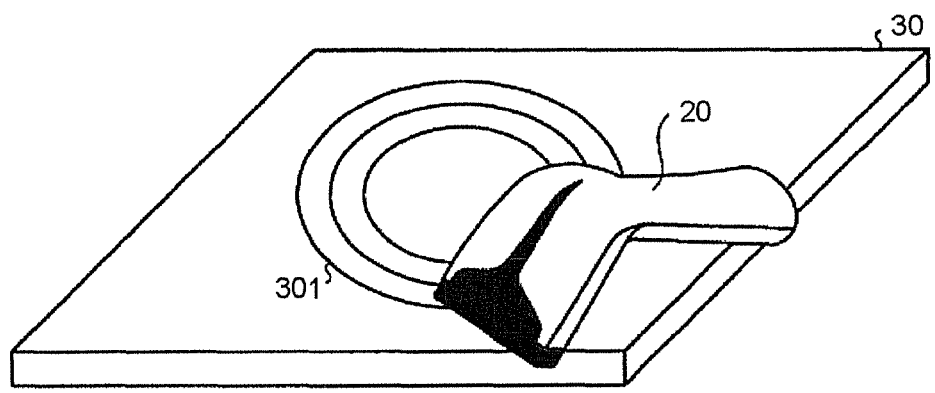
FIG. 6 is an illustration diagram exemplifying the arrangement of the peripheral device at an improper position.

In a case in which the peripheral device 20 is arranged at a proper position, the non-contact charger 30 transmits electric power to the non-contact power reception section 27 of the peripheral device 20 through the non-contact power transmission section 32. FIG. 5 is a diagram exemplifying the arrangement of the peripheral device 20 at a proper position. FIG. 6 is a diagram exemplifying the arrangement of the peripheral device 20 at an improper position. A concentric circle 301 is drawn on the front or upper surface of the non-contact charger 30 shown in FIG. 5 and FIG. 6. As shown in FIG. 5, if being placed at the center of the concentric circle 301, the peripheral device 20 can receive the electric power transmitted from the non-contact power transmission section 32. As shown in FIG. 6, if the peripheral device 20 is arranged at a position away from the center of the concentric circle 301, then the electric power transmitted to the peripheral device 20 is decreased according to the distance. Consequentially, the non-contact power reception section 27 of the peripheral device 20 cannot receive all or part of the electric power transmitted from the non-contact power transmission section 32 of the non-contact charger 30. Thus, it is important to arrange the peripheral device 20 at a proper position of the non-contact charger 30. The proper position refers to a position where the magnetic flux generated by the non-contact charger 30 causes the non-contact power reception section 27 to generate an induced current. That is, the proper position refers to a position where the non-contact power reception section 27 of the peripheral device 20 is adjacent to the center of the concentric circle 301.

Figure 7:
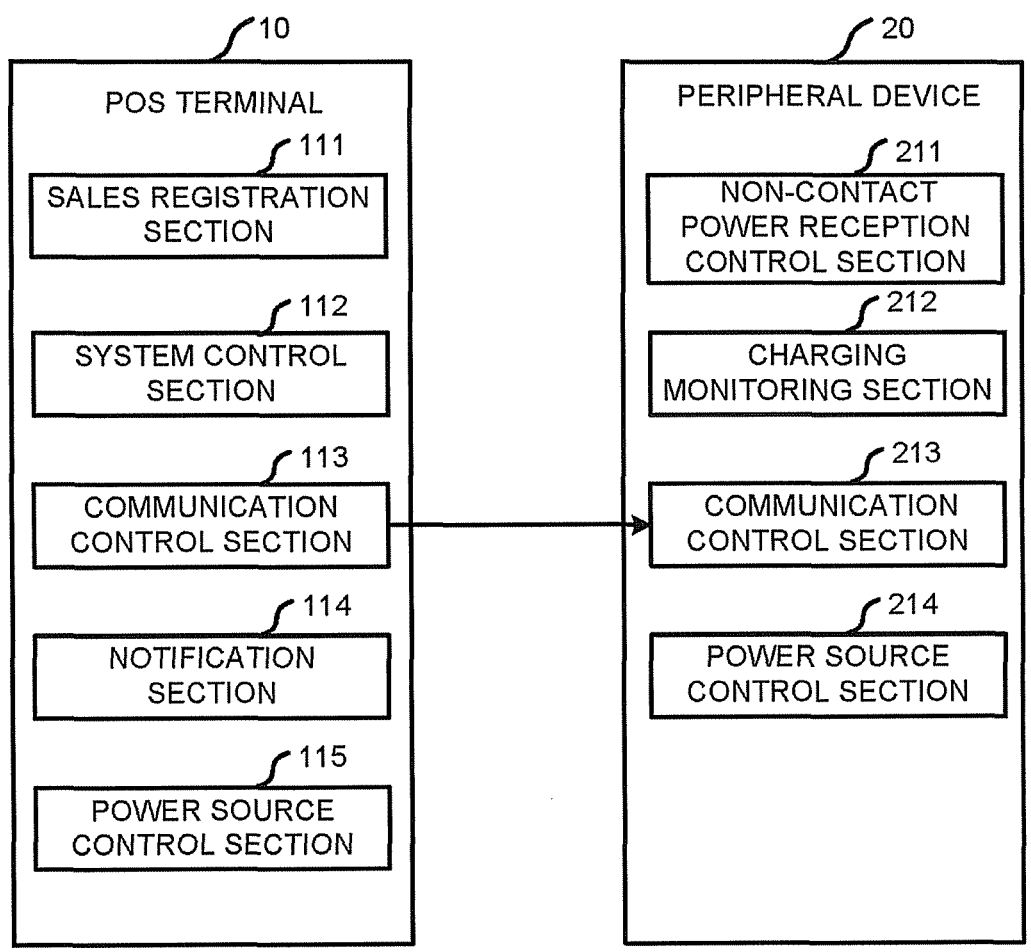
FIG. 7 is a diagram illustrating the functional component of a POS system.

Sequentially, the functional component of the POS system 1 is described. FIG. 7 is a diagram illustrating the functional component of the POS system 1.

The functional component of the POS terminal 10 is described. As shown in FIG. 7, the POS terminal 10 comprises, as functional sections, a sales registration section 111, a system control section 112, a communication control section 113, a notification section 114 and a power source control section 115. Specifically, each functional section is generated on the RAM 13 through executing the notification program PR1 stored in the storage section 15 by the CPU 11 of the POS terminal 10.

The sales registration section 111 carries out a sales registration processing for a commodity (sales object) relating to one transaction. Specifically, the sales registration section 111 carries out the sales registration processing by recording the commodity codes, the prices and the sales quantities input through the peripheral device 20a serving as a code scanner and the peripheral device 20c serving as a keyboard in a sales master file. Moreover, the sales registration section 111 causes the peripheral device 20b serving as a printer to print the content of the sales registration.

The system control section 112 controls the non-contact power supply system relating to the POS system 1. The system control section 112 generates monitoring request information and monitoring stop information to monitor the state of the non-contact power supply for the peripheral device 20. The monitoring request information refers to a request for monitoring the quantity of the electric power received in a non-contact manner in each unit time. The monitoring stop information refers to a request for stopping monitoring the quantity of the electric power received in a non-contact manner in each unit time. The POS terminal 10 becomes a state in which the peripheral device 20 is not used if the sales registration processing is ended. Thus the communication control section 113 outputs the monitoring request information to the peripheral device 20 when the sales registration processing is ended.

For example, as the peripheral device 20a serving as a code scanner reads a commodity code attached to a commodity in a sales registration processing, the peripheral device 20a serving as the code scanner cannot receive the electric power transmitted from the non-contact charger 30 in the sales registration processing. Therefore, the POS terminal 10 gives an error notice in which the monitoring to the non-contact power supply is not stopped in the sales registration processing. To avoid the error notice, the communication control section 113 outputs the monitoring request information to the peripheral device 20 if the sales registration processing is ended. Moreover, the communication control section 113 outputs the monitoring stop information to the peripheral device 20 if a sales registration processing is started.

The communication control section 113 (communication control module) controls, via the communication interface 16, the communication with the peripheral device 20 wirelessly connected with the POS terminal 10. In a case in which the communication interface 16 communicates according to a standard such as Bluetooth, the communication control section 113 controls the communication with a peripheral device 20 which is paired with the POS terminal 10. The 'pairing' refers to a processing in which a peripheral device 20 and the POS terminal 10 are associated with each other so that it is ensured that the POS terminal 10 does not communicate in error with an irrelevant device nearby the POS terminal 10.

Moreover, the communication control section 113 sends the monitoring request information or the monitoring stop information to the one or more peripheral devices 20 of the POS system 1. In the present embodiment, the communication control section 113 outputs the monitoring request information or the monitoring stop information to the peripheral devices 20a, 20b and 20c.

Further, the communication control section 113 receives charging state information from the peripheral device 20. The communication control section 113 (input module) receives the input of the charging state information output from the peripheral device 20. The charging state information conveys the state of the non-contact power supply for the peripheral device 20 which outputs the charging state information. The charging state information includes the state of non-contact power supply, the residual amount of charge and a peripheral device code. The state of non-contact power supply indicates the quantity of the electric power received by the peripheral device 20 from the non-contact charger 30 in a non-contact manner in each unit time. The residual amount of charge indicates the residual amount of charge which can be supplied to the secondary battery 26 of the peripheral device 20. The peripheral device code is identification information capable of identifying the peripheral device 20 which outputs the charging state information.

The notification section 114 notifies the state of the non-contact power supply for the peripheral device 20. The notification section 114 (notification module) notifies the state of the non-contact power supply for the peripheral device 20 if the communication control section 113 receives the input of the charging state information. Specifically, the notification section 114 generates a notification screen if the input of the charging state information is received.

The notification section 114 displays the notification screen on the display section 17.

Figure 8:
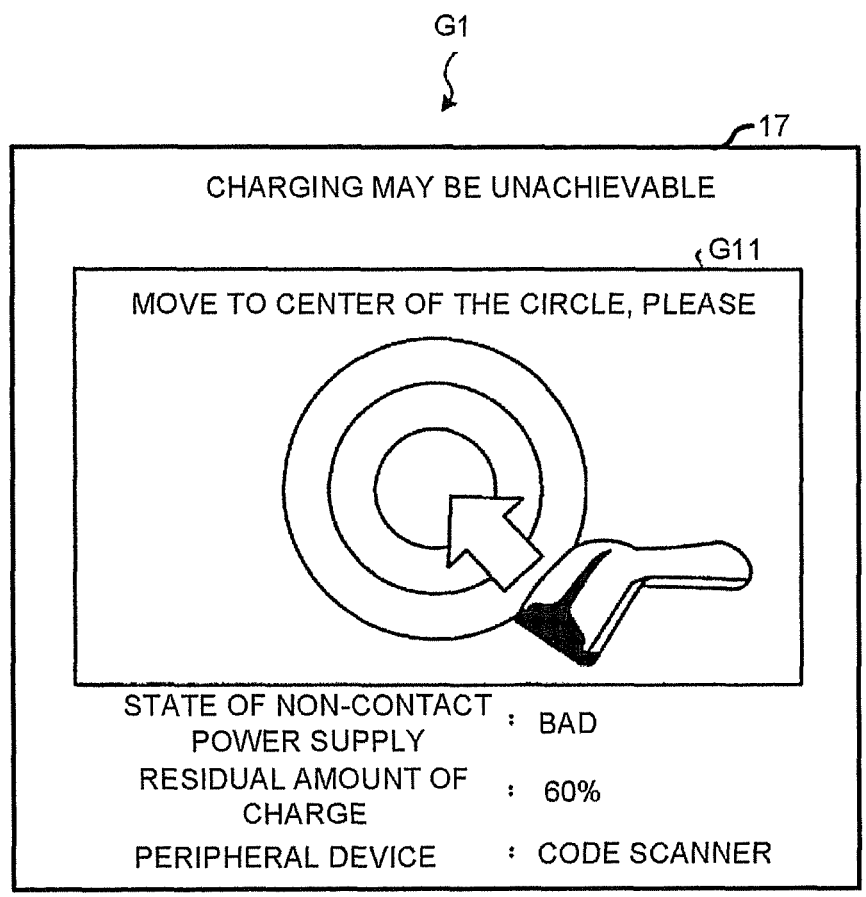
FIG. 8 is a diagram exemplifying a notification screen.

FIG. 8 is a diagram exemplifying a notification screen G1. The notification screen G1 notifies that the quantity of the electric power received by the peripheral device 20 in a non-contact power supply manner is smaller than a threshold value. The notification screen G1 shown in FIG. 8 exemplifies, if the input of charging state information is received, that 'the state of non-contact power supply: bad, the residual amount of charge: 60% and peripheral device code: code scanner'. The notification screen G1 shown in FIG. 8 displays a message 'charging may not be established' to give a notice. Further, the notification screen G1 includes a correction request screen G11. The correction request screen G11 is used to request the correction of the arrangement position of the peripheral device 20. The correction request screen G11 shown in FIG. 8 displays a message 'move to the center of the circle please' and an image thereof.

The notification section 114 may change the notification content depending on the quantity of the electric power received in each unit time indicated by the state of non-contact power supply. For example, the notification section 114 changes the message or image displayed on the notification screen G1 according to the poor or bad state of non-contact power supply. Alternatively, the notification section 114 displays the notification screen G1 on the whole screen of the display section 17 if the state of non-contact power supply is bad. If the state of non-contact power supply is poor, the notification section 114 may display a mark, an icon or characters representing the poor state of non-contact power supply on a part of the display section 17.

Further, the notification section 114 may notify the state of non-contact power supply regardless of the quantity of the electric power received in each unit time indicated by the non-contact power supply state. Specifically, the notification section 114 displays the notification screen G1 on the whole or a part of the display section 17 if the charging state information is input. Alternatively, the notification section 114 may continuously display a mark, an icon or characters representing the content of the charging state information on a part of the display section 17. In this way, the operator can confirm whether the peripheral device 20 is arranged at a proper position.

The power source control section 115 controls the shutdown processing of the POS terminal 10. The power source control section 115 stops the POS terminal 10 through a shutdown processing if a request for a shutdown processing is input.

Sequentially, the functional component of the peripheral device 20 is described. As shown in FIG. 7, the peripheral device 20 comprises, as functional sections, a non-contact power reception control section 211, a charging monitoring section 212, a communication control section 213 and a power source control section 214. Specifically, the CPU 21 of the peripheral device 20 generates each functional section on the RAM 23 by executing a charging monitoring program PR2 stored in the ROM 22.

The non-contact power reception control section 211 controls the non-contact power supply for the peripheral device 20. The non-contact power reception control section 211 receives the electric power transmitted from non-contact charger 30 through the non-contact power reception section 27. Moreover, the non-contact power reception control section 211 charges the secondary battery 26 with the received electric power.

The charging monitoring section 212 (monitoring module) monitors the electric power received from the non-contact charger 30 through the non-contact power reception section 27. Moreover, the charging monitoring section 212 generates charging state information.

The charging monitoring section 212 monitors the quantity of the electric power received in a non-contact manner if the input of the monitoring request information output from the POS terminal 10 is received. Moreover, if the input of the monitoring stop information output from the POS terminal 10 is received, the charging monitoring section 212 stops monitoring the electric power received in a non-contact manner. In this way, by using the charging monitoring section 212, the information processing apparatus prevents the giving of an error notice in a case where non-contact power supply is not established.

Further, there is a case in which the operator electrically disconnects the peripheral device 20 from the non-contact charger 30 temporarily even if the sales registration processing is completed or intentionally takes the peripheral device 20 off the non-contact charger 30 once the sales registration processing is completed. If such a situation is notified immediately as poor or bad non-contact power supply, then the operator must deal with the troublesome notification. Thus, the charging monitoring section 212 generates charging state information if the poor or bad state of non-contact power supply is not eliminated until a setting time elapses.

Specifically, the charging monitoring section 212 sets initial value for a timer if the input of the monitoring request information is received. Moreover, the charging monitoring section 212 starts the timer. If the state of non-contact power supply is good, the charging monitoring section 212 sets initial value for the timer again. On the other hand, if the state of non-contact power supply is poor or bad, the charging monitoring section 212 keeps the timer counting. The charging monitoring section 212 generates charging state information if the timer value counts the initial value.

In this case, the charging monitoring section 212 measures the residual amount of charge which is being supplied to the secondary battery 26. Moreover, the charging monitoring section 212 generates charging state information including the state of non-contact power supply, the residual amount of charge and a peripheral device code representing a peripheral device.

The communication control section 213 controls the communication with the POS terminal 10 via the communication interface 25. Specifically, the communication control section 213 sends the charging monitoring information to the POS terminal 10. If the quantity of the electric power received is below a first threshold value, the communication control section 213 serving as an output module outputs the charging state information generated by the charging monitoring section 212. Further, the communication control section 213 receives the monitoring request information or monitoring stop information from the POS terminal 10. The communication control section 213 serving as an input module receives the input of the monitoring request information representing a request for the monitoring on non-contact power supply.

The power source control section 214 controls the shutdown processing of the peripheral device 20. The power source control section 214 stops the peripheral device 20 through the shutdown processing if a request for a shutdown processing is input.

Sequentially, a notification processing is described which is carried out by the CPU 11 of the POS terminal 10 according to the foregoing embodiment according to the notification program PR1. The notification processing is carried out to notify the state of the charging of the peripheral device 20.

Figure 9:
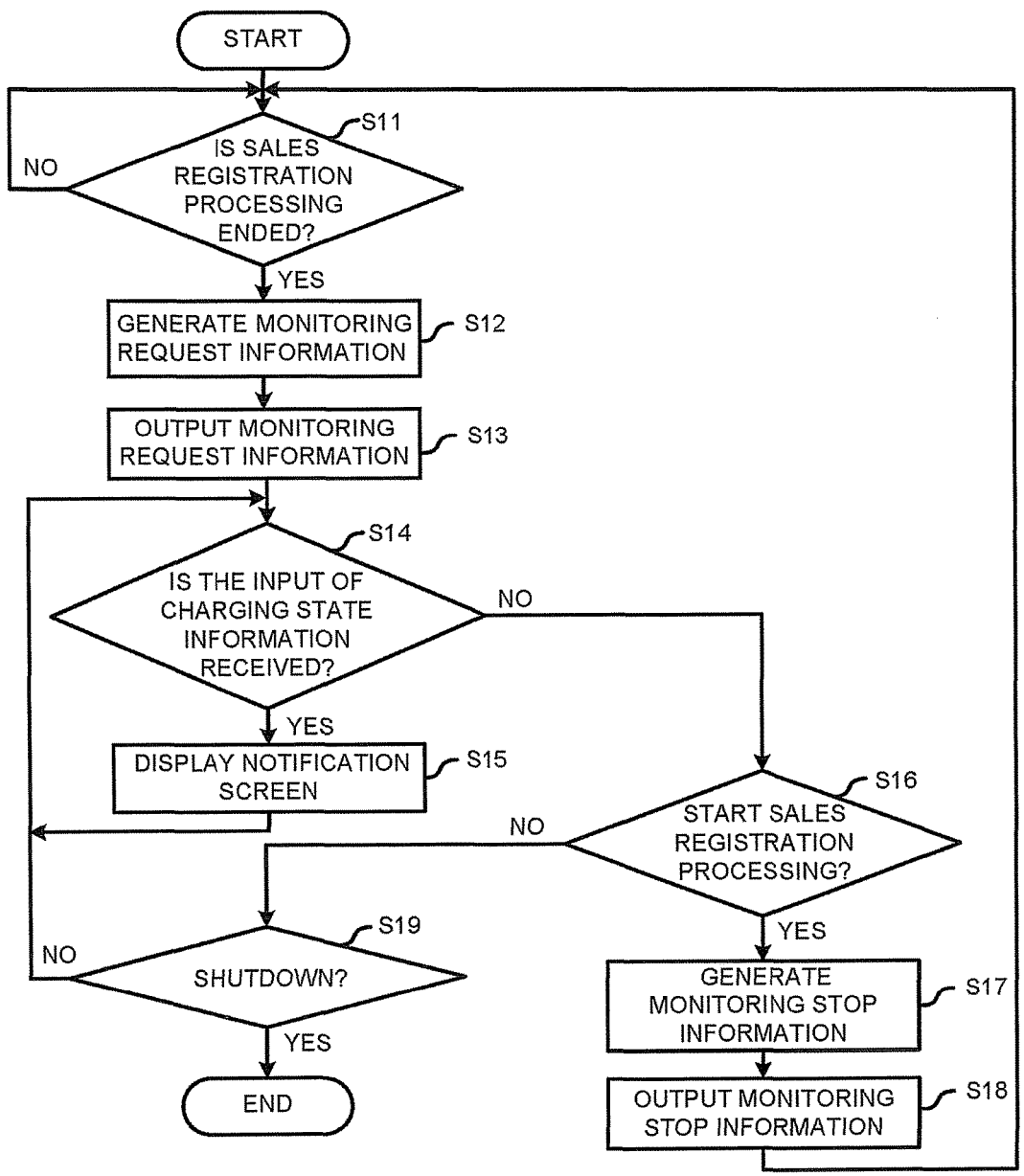
FIG. 9 is a flowchart illustrating the procedure of a notification processing.

FIG. 9 is a flowchart illustrating the procedure of a notification processing carried out by the CPU 11 of the POS terminal 10 according to the notification program PR1.

First, the sales registration section 111 of the POS terminal 10 determines whether or not the sales registration processing according to one transaction is ended (Act S11). If the sales registration processing is not ended (No in Act S11), the sales registration section 111 of the POS terminal 10 waits for a notification processing.

On the other hand, if the sales registration processing is ended (Yes in Act S11), the system control section 112 of the POS terminal 10 generates monitoring request information (Act S12). Then, the communication control section 113 of the POS terminal 10 outputs the monitoring request information to the peripheral device 20 (Act S13).

Sequentially, the communication control section 113 of the POS terminal 10 determines whether or not the input of charging state information is received (Act S14). If the input of charging state information is received (Yes in Act S14), the notification section 114 of the POS terminal 10 displays the notification screen G1 (Act S15). Moreover, the CPU 11 of the POS terminal 10 proceeds to the processing in Act S14.

On the other hand, if the input of charging state information is not received (No in Act S14), the sales registration section 111 of the POS terminal 10 determines whether or not a sales registration processing is started (Act S16).

If a sales registration processing is started (Yes in Act S16), the system control section 112 of the POS terminal 10 generates monitoring stop information (Act S17). The communication control section 113 of the POS terminal 10 outputs the monitoring stop information to the peripheral device 20 (Act S18). Moreover, the CPU 11 of the POS terminal 10 proceeds to the processing in Act S11.

If a sales registration processing is not started (Act S16: No), the power source control section 115 of the POS terminal 10 determines whether or not the POS terminal 10 is shut down (Act S19). If the POS terminal 10 is not shut down (No in Act S19), the CPU 11 of the POS terminal 10 proceeds to the processing in Act S14.

On the other hand, if the POS terminal 10 is shut down (Yes in Act S19), the CPU 11 of the POS terminal 10 ends the notification processing.

Next, a charging monitoring processing is described which is carried out by the CPU 21 of the peripheral device 20 relating to the foregoing embodiment according to the charging monitoring program PR2. The charging monitoring processing refers to a processing of monitoring the state of the charging of the peripheral device 20.

FIG. 10 is a flowchart illustrating the procedure of a charging monitoring processing carried out by the CPU 21 of the peripheral device 20 according to the charging monitoring program PR2.

First, the communication control section 213 of the peripheral device 20 determines whether or not the input of monitoring request information is received (Act S21). If the input of monitoring request information is not received (No in Act S21), the CPU 21 of the peripheral device 20 waits for a charging monitoring processing.

On the other hand, if the input of monitoring request information is received, (Yes in Act S21), then the charging monitoring section 212 of the peripheral device 20 sets initial value for the timer (Act S22). Then, the charging monitoring section 212 of the peripheral device 20 determines whether or not the state of non-contact power supply is good (Act S23).

If the state of non-contact power supply is poor (No in Act S23), then the charging monitoring section 212 of the peripheral device 20 determines whether or not a setting time elapses (Act S24). If the setting time does not elapse (No in Act S24), the CPU 21 of the peripheral device 20 proceeds to the processing in Act S23.

On the other hand, if the setting time elapses (Yes in Act S24), the charging monitoring section 212 of the peripheral device 20 measures the residual amount of charge which is being supplied to the secondary battery 26 (Act S25). Sequentially, the charging monitoring section 212 of the peripheral device 20 generates charging state information including the state of non-contact power supply, the residual amount of charge and a peripheral device code representing the peripheral device 20 (Act S26).

Sequentially, the communication control section 213 of the peripheral device 20 outputs the charging state information to the POS terminal 10 (Act S27). Moreover, the CPU 21 of the peripheral device 20 proceeds to the processing in Act S28.

If the state of non-contact power supply is good (Yes in Act 23), the communication control section 213 of the peripheral device 20 determines whether or not the input of monitoring stop information is received (Act S28). If the input of monitoring stop information is not received (No in Act S28), the CPU 21 of the peripheral device 20 proceeds to the processing in Act S22.

On the other hand, if the input of monitoring stop information is received (Yes in Act S28), then the power source control section 214 of the peripheral device 20 determines whether or not the peripheral device 20 is shut down (Act S29). If the peripheral device 20 is not shut down (No in Act S29), the CPU 21 of the peripheral device 20 proceeds to the processing in Act S21.

On the other hand, if the peripheral device 20 is shut down (Yes in Act S29), the CPU 21 of the peripheral device 20 ends the charging monitoring processing.

As stated above, according to the POS system 1 of the present embodiment, the POS terminal 10 can receive, from the peripheral device 20 corresponding to the POS terminal 10, charging state information representing the state of non-contact power supply for the peripheral device 20. Moreover, if receiving the charging state information, the POS terminal 10 notifies the non-contact power supply information of the peripheral device 20. In this way, the POS terminal 10 can notify the state of the non-contact power supply for the peripheral device 20.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

Further, in the foregoing embodiment, the notification section 114 of the POS terminal 10 notifies the state of the non-contact power supply for the peripheral device 20 by displaying the notification screen G1 on the display section 17. However, the notification section 114 may notify the state of the non-contact power supply for the peripheral device 20 in another way different from displaying the notification screen G1. For example, the notification section 114 may notify that the state of non-contact power supply is poor or bad with voice.

Further, it is described in the foregoing embodiment that the state of non-contact power supply contained in the charging state information is determined by the received power detection circuit 271. However, the state of non-contact power supply contained in the charging state information may also be determined by the CPU 21 of the peripheral device 20. In such a case, the received power detection circuit 271 notifies the CPU 21 of the quantity of the electric power received in each unit time. Then, the CPU 21 determines the state of non-contact power supply according to the received electric power quantity. Moreover, as the CPU 21 uses software for the determination, a threshold value relating to the determination on the state of non-contact power supply state can be set to any value.

The programs executed by each device according to the foregoing embodiments or variations of the foregoing embodiments are pre-compiled in the storage medium (e.g. a ROM or a storage section) of the device; however, the present invention is not limited to this. The programs may be recorded in a computer-readable recording medium such as a CD-ROM, a FD (Floppy Disk), a CD-R, and a DVD (Digital Versatile Disk) as installable or executable files. Further, the storage medium, which is not limited to a medium independent from a computer or assembled in a system, further includes a storage medium for storing or temporarily storing a program transferred via and downloaded through an LAN or Internet.

Further, the programs executed by each device according to the foregoing embodiments or variations of the foregoing embodiments are stored in a computer connected with a network such as the Internet and downloaded in the apparatus, or are provided or issued by a network such as the Internet.

What is claimed is:

1. An information processing apparatus, comprising:
   circuitry configured to
   control communication with a code scanner which is associated with the information processing apparatus,
   receive an input of a charging state information, output from the code scanner, which indicates the state of non-contact power supply to the code scanner with a non-contact manner in which no mechanical connection is taken with the code scanner;
   notify that a quantity of electric power received by the code scanner in a non-contact manner in each unit time is below a threshold value, if it is determined, based on the received charging state information, that the quantity of electric power is below the threshold value, and
   output monitoring request information for requesting to monitor whether the quantity of the electric power is below the threshold value if sales registration processing using the code scanner is ended, and output monitoring stop information for requesting to stop monitoring whether the quantity of the electric power is below the threshold value, if the sales registration processing using the code scanner is started.

2. The information processing apparatus according to claim 1, further comprising a display, wherein the circuitry is configured to notify the quantity of the electric power is below the threshold value, by displaying on the display.

3. The information processing apparatus according to claim 1, wherein the charging state information includes charging state information indicating the quantity of the electric power, and the circuitry is configured to change content of the notification according to the quantity of the electric power.

4. The information processing apparatus according to claim 1, wherein the charging state information includes identification information capable of identifying the code scanner which outputs the charging state information and the circuitry is further configured to notify the identification information.

5. A system comprising:
   an information processing apparatus; and
   a code scanner which is used by the information processing apparatus, the code scanner comprising:
   a power reception circuit configured to receive electric power transmitted in non-contact manner in which no mechanical connection is taken; and
   circuitry configured to
   monitor whether a quantity of the electric power received by the power reception circuit is below a threshold value, and
   output charging state information which indicates that the quantity of the electric power is below the threshold value, to the information processing apparatus,
   the information processing apparatus comprising circuitry configured to
   control communication with a code scanner which is associated with the information processing apparatus,
   receive an input of a charging state information, output from the code scanner, which indicates a state of non-contact power supply to the code scanner with a non-contact manner in which no mechanical connection is taken with the code scanner;
   notify that a quantity of electric power received by the code scanner in a non-contact manner in each unit time is below a threshold value, if it is determined, based on the received charging state information, that the quantity of electric power is below the threshold value, and
   output monitoring request information for requesting to monitor whether the quantity of the electric power is below the threshold value if sales registration processing using the code scanner is ended, and output monitoring stop information for requesting to stop monitoring whether the quantity of the electric power is below the threshold value, if the sales registration processing using the code scanner is started.

\* \* \* \* \*